No. 643,091. Patented Feb. 6, 1900.
J. W. HAYS.
NEST FOR POULTRY.
(Application filed Sept. 20, 1899.)
(No Model.) 2 Sheets—Sheet 1.
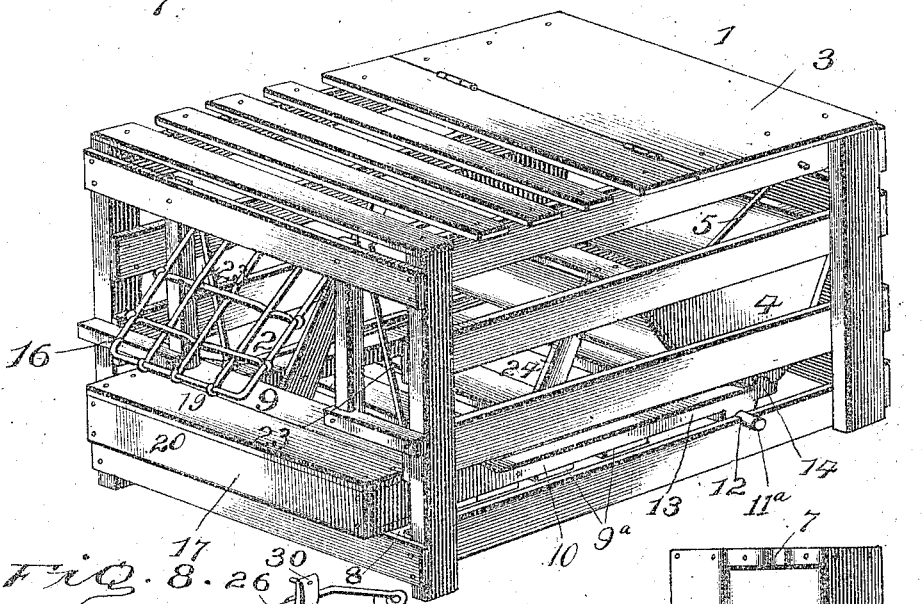
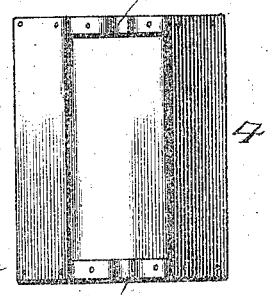
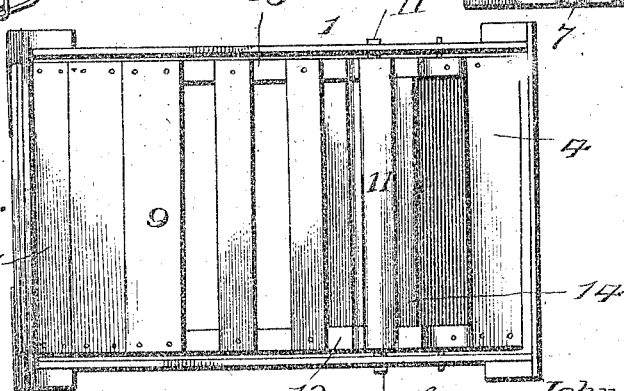
Witnesses
Gladys L. Thompson
Genevieve Matthews
Inventor
John W. Hays
by R.H.A.B. Lacey, his Attorneys

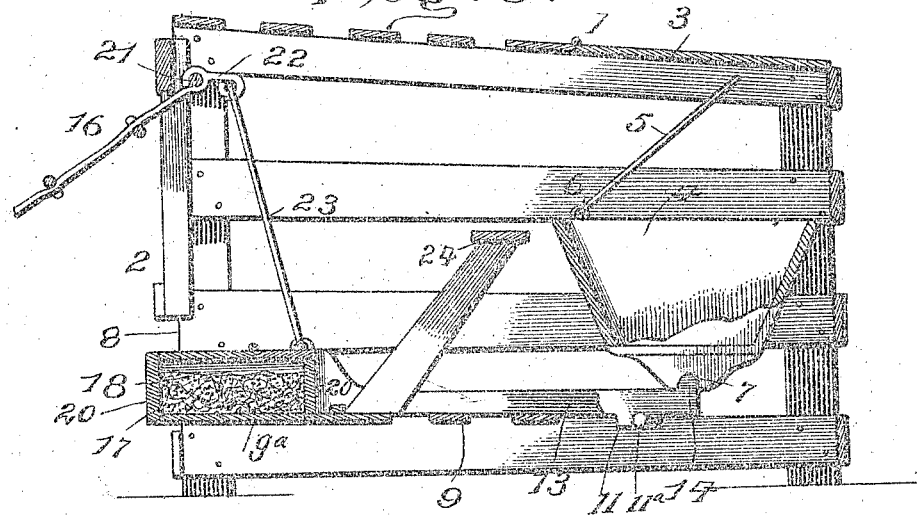
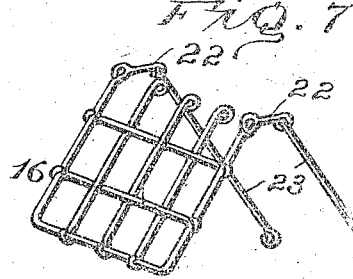
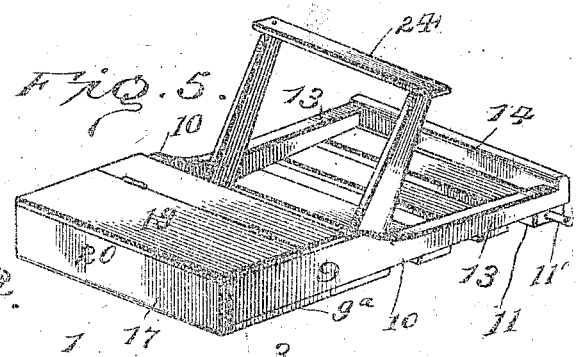
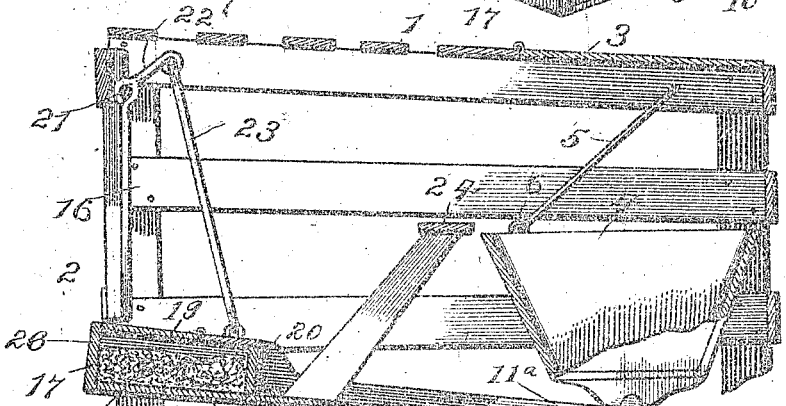

UNITED STATES PATENT OFFICE.

JOHN W. HAYS, OF OKLAHOMA, OKLAHOMA TERRITORY, ASSIGNOR OF ONE-HALF TO J. H. MARKWELL, OF SAME PLACE.

NEST FOR POULTRY.

SPECIFICATION forming part of Letters Patent No. 643,091, dated February 6, 1900.

Application filed September 20, 1899. Serial No. 731,094. (No model.)

*To all whom it may concern:*

Be it known that I, JOHN W. HAYS, a citizen of the United States, residing at Oklahoma City, in the county of Oklahoma and Territory of Oklahoma, have invented certain new and useful Improvements in Nests for Poultry; and I do hereby declare the following to be a full, clear, and exact description of the invention, such as will enable others skilled in the art to which it appertains to make and use the same.

This invention has relation to nests for poultry, and is designed as an improvement upon the nest shown in my former application for Letters Patent, filed June 20, 1899, Serial No. 721,235, the object of the present invention being to provide a simplified structure having an improved automatic door adapted to close when the hen is in the nest to prevent entrance of other hens thereto and to open when the hen leaves the nest.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment is illustrated in the accompanying drawings, in which—

Figure 1 is a perspective view of a device constructed in accordance with and embodying the essential features of the invention. Fig. 2 is a view of the device inverted. Fig. 3 is a vertical longitudinal section of the framework, showing the operative parts in their normal positions with the door open for entrance of a hen. Fig. 4 is a similar view showing the relation of the parts when a hen is in the nest. Fig. 5 is a detail perspective view of the tilting platform and weight-box. Fig. 6 is a bottom plan view of the nest. Fig. 7 is a detail perspective view of the gate and connections. Fig. 8 is a similar view of a modified form of gate and connections.

Corresponding and like parts are referred to in the following description and indicated in all the views of the drawings by the same reference characters.

The device comprises an inclosure 1, in the form of a house or coop, the inclosing sides or walls being composed of slats which are spaced apart for the purpose of ventilation and the admission of light, besides providing a structure easily portable and readily accessible for the purpose of inspection and cleaning. This framework or coop is provided in its front end with a door-opening 2 and in its top side with an opening closed by a door 3, which latter is hinged to swing upwardly and forwardly at its free end. This door is located at the rear end of the coop and directly over the nest, but may cover practically the entire top of the coop, and serves the double purpose of protecting said nest from rain and admitting of access to the nest for the removal of eggs laid therein.

The nest 4 is located at the rear of the framework and comprises a shallow tray having its front and rear walls upwardly divergent and of a length to extend from one side wall of the coop to the other without touching either. This nest is mounted in the manner hereinafter described to have a slight tilting or rocking movement and is held in position and limited in such movement by supporting-rods 5, jointed at their lower ends to eyes 6 upon the forward portion of the nest and detachably connected at their upper ends to the framework, and upon the under side of the nest journals or rocker-bearings 7 are provided.

The tilting platform 9 is located in advance of the nest and is supported by means of longitudinally-disposed sills 10, connected by transverse slats $9^a$ and secured adjacent to their rear ends to a cross-beam 11, having its end portions reduced and forming journals $11^a$, which obtain bearings in notches 12, formed in the upper edges of transversely-alining side slats. The longitudinal sills have reduced rear ends, forming arms 13, which extend beneath the nest, and are further connected by an upper cross-bar 14, provided with rests or journals for the notched rocker-bearings 7 of the nest, whereby the nest is mounted to tilt independently of the platform to accommodate itself to the movements thereof and maintain a substantially upright position at all times, the tilting movement of the nest being limited by the supporting-rods 5. The forward end of the platform 9 is movable vertically in a transverse opening 8, formed in the front of the framework below the door-opening 2, and constitutes an approach to the nest and is weighted, so as to normally hold the nest elevated. A box 17 is applied to the said front end of the platform and is adapted to receive weights 18 for counterbalancing the nest and the eggs laid therein, so as to hold the door 16 in such a position as to uncover the opening 2 when the nest is elevated. This box is closed at top by a cover having a hinged section 19, whereby access may be had thereto for placing additional weights therein or removing some of the weights therefrom. The body of the box is formed by the front ends of the sills 10, front and back cross-pieces 20, and the slats 9ª at the forward end of the platform, which are placed closely together to form the bottom of the box.

The door 16 is hinged or pivoted at its upper end to a transverse shaft 21, mounted at the top of the door-opening 2, so as to swing outward and upward at its lower end, and has attached thereto or formed thereon inward-projecting crank-arms 22. These arms are jointed to the upper ends of connecting-rods 23, which are in turn jointed at their lower ends to the forward end of the platform, the construction and arrangement being such that the upward movement of the platform will cause the door to close, while the downward movement thereof will draw upon the crank-arms to cause the door to swing outward and open. A trip 24 is applied to the platform at or near the rear end of the box 17 and serves as a perch or rest upon which the hen alights in entering and leaving the nest. The upper end or platform of this trip, perch, or rest is normally disposed in the plane of the top of the nest, and the weight of the hen alighting thereon on leaving the nest is communicated thereby to the platform, which tilts downward and forces the door open.

As shown in Fig. 1, the nest is normally held elevated, the platform depressed, and the door open. When a hen passes through the door-opening 2 and perches upon the nest, the latter is depressed and the platform elevated, thereby forcing the connecting-rods 23 and crank-rods 22 upward and causing the door 16 to close. As the hen leaves the nest and steps upon the perch or trip 24 the platform will descend and force the door open through the medium of the connections aforesaid. At the same time that the front end of the platform lowers the nest will rise, thereby setting the device for the next hen, as will be readily understood. The eggs are removed from the nest through the opening closed by the door 3, as previously stated.

In Fig. 8 I have shown a modified construction of swing-door 16, which is somewhat simpler in construction and adapted to be more conveniently detached. The frame 25 of this door is formed of a piece of stout wire bent into U shape and thence extended laterally or at right angles to said frame to provide the bearing-arms 26 and to form the crank-arms 27, extending at right angles to said bearing-arms and adapted for the attachment thereto of the connecting-rods 23. The open space of the door-frame thus constructed is closed by longitudinal and transverse rods 28. The bearing-arms 26 are journaled in open bearing-blocks 29, secured to the coop, and are confined therein by pins 30, which may be removed whenever it is desired to detach the door.

Having thus described the invention, what is claimed as new is—

1. In a nest, the combination of a casing or inclosing framework, a tilting platform arranged therein and pivoted between its ends and provided with journals at its rear end, supporting-rods connected to the casing, and a nest arranged above the platform and jointed at its top to said rods and provided on its under side with notched bearings engaging said journals, substantially as described.

2. In a nest, the combination of a casing or inclosing framework having a door-opening, a tilting platform arranged therein and pivoted between its ends and provided at its front end with a closed box for the reception of weights and at its rear end with lower journals having bearing in the casing and also with upper journals, a hinged door controlling said door-opening and comprising a frame having crank-arms, connecting-rods jointed at their upper ends to said crank-arms and at their lower ends to said box, pendent supporting-rods connected to the casing at the rear thereof, and a nest arranged above the platform and jointed at its top to said rods and provided on its under side with notched bearings engaging said journals, substantially as described.

In testimony whereof I affix my signature in presence of two witnesses.

JOHN W. HAYS. [L. S.]

Witnesses:
 CHAS. W. MORRISON,
 H. C. HUNT.